(12) United States Patent
Noguchi

(10) Patent No.: US 9,641,705 B2
(45) Date of Patent: May 2, 2017

(54) IMAGE FORMING APPARATUS FOR READING INDICIA ON A SHEET AND INSERTING IMAGES ON A SUBSEQUENT PRINTED SHEET AT A LOCATION CORRESPONDING TO THE LOCATION OF THE READ INDICIA

(71) Applicant: FUJI XEROX CO., LTD., Tokyo (JP)

(72) Inventor: Hiroki Noguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/829,268

(22) Filed: Aug. 18, 2015

(65) Prior Publication Data
US 2016/0219164 A1   Jul. 28, 2016

(30) Foreign Application Priority Data

Jan. 28, 2015   (JP) .................................. 2015-014636

(51) Int. Cl.
*H04N 1/00*   (2006.01)
*G06F 3/12*   (2006.01)

(52) U.S. Cl.
CPC . *H04N 1/00336* (2013.01); *H04N 2201/0081* (2013.01); *H04N 2201/0082* (2013.01)

(58) Field of Classification Search
CPC .......... H04N 1/00334; H04N 1/00336; H04N 1/00374; G06F 3/1243
USPC .................. 358/1.1, 1.15, 1.2, 1.6, 1.18, 1.5
See application file for complete search history.

(56) References Cited

U.S. PATENT DOCUMENTS

| 4,596,038 | A | * | 6/1986 | Yoshida | G06K 9/18 382/182 |
| 5,664,076 | A | * | 9/1997 | Pluta | G06K 19/06009 358/1.1 |
| 6,243,172 | B1 | * | 6/2001 | Gauthier | G06F 17/211 345/641 |
| 2003/0086706 | A1 | * | 5/2003 | Kinjo | G03B 17/00 396/420 |
| 2005/0057779 | A1 | * | 3/2005 | Sesek | G06K 9/2063 358/400 |
| 2008/0306884 | A1 | * | 12/2008 | Weinberg | B42D 15/02 705/410 |

FOREIGN PATENT DOCUMENTS

| JP | 2001-186327 A | 7/2001 |
| JP | 2006-130836 A | 5/2006 |

* cited by examiner

*Primary Examiner* — Eric A Rust
(74) *Attorney, Agent, or Firm* — Oliff PLC

(57) ABSTRACT

An image processing device includes a detector, a recognition unit, an acquisition, unit, and an output unit. The detector detects an image formed on a sheet, and a mark applied to the sheet. The recognition unit recognizes a mark position, which is a position where the mark is formed on the image. The acquisition unit acquires an additional image to be added and formed at the mark position. The output unit forms an output image using the image detected by the detector and the additional image acquired by the acquisition unit.

15 Claims, 13 Drawing Sheets

FIG. 3A
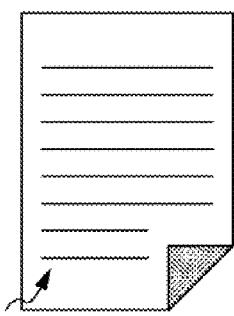
FIG. 3B
DATA LIST 1
| NAME | DATE | ADDRESS |
|---|---|---|
| TARO FUJI | 1/1/20XX | MINATO MIRAI, NISHI-KU, YOKOHAMA |
| HANAKO FUJI | 1/1/20XX | MINATO MIRAI, NISHI-KU, YOKOHAMA |
| JIRO FUJI | 1/1/20XX | MINATO MIRAI, NISHI-KU, YOKOHAMA |
FIG. 3C
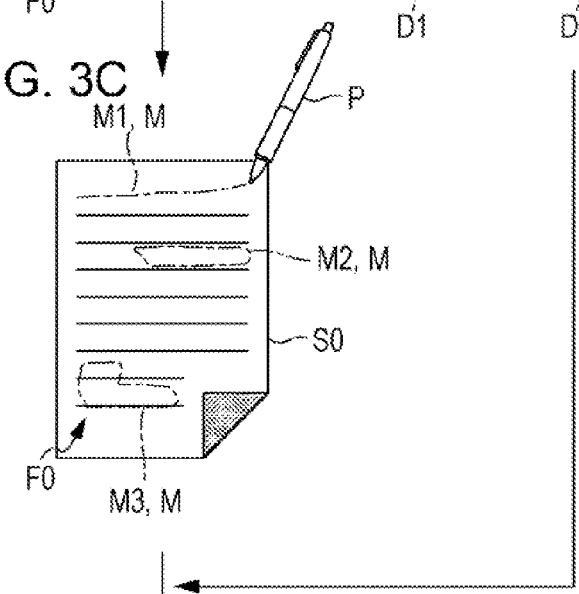
FIG. 3D
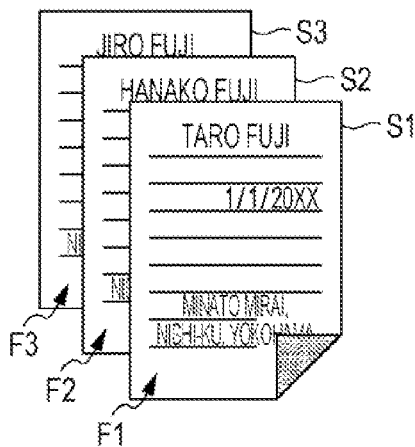

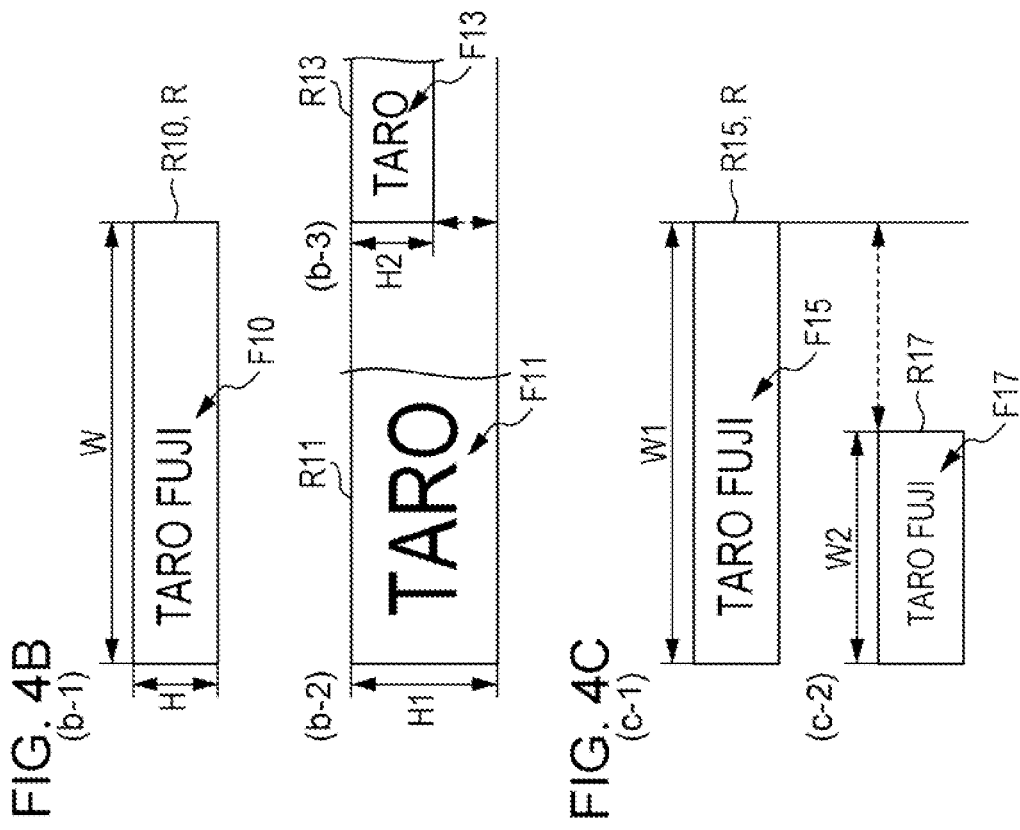
FIG. 4B
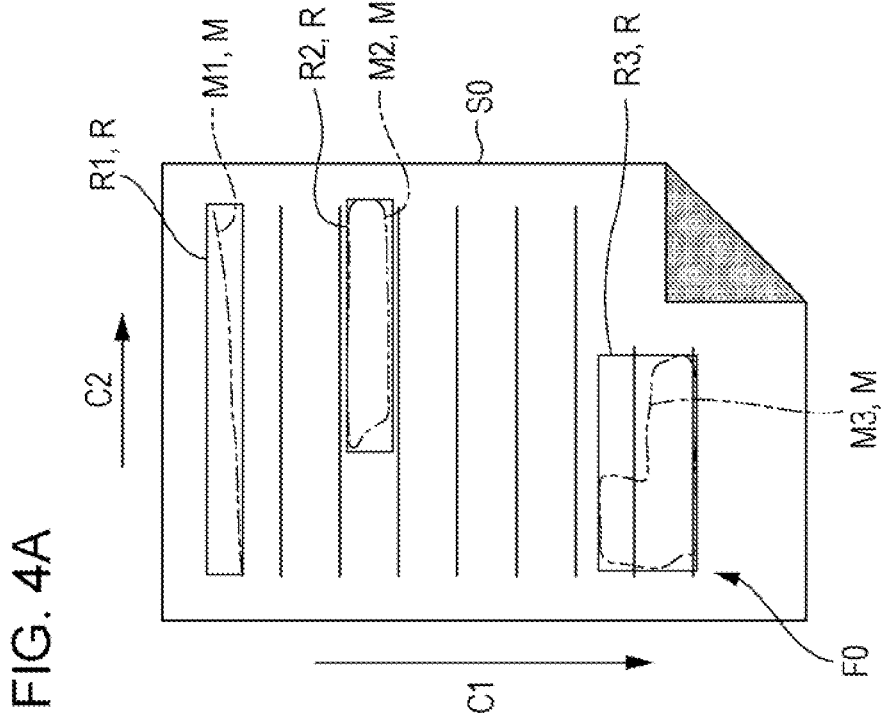
FIG. 4C
FIG. 4A

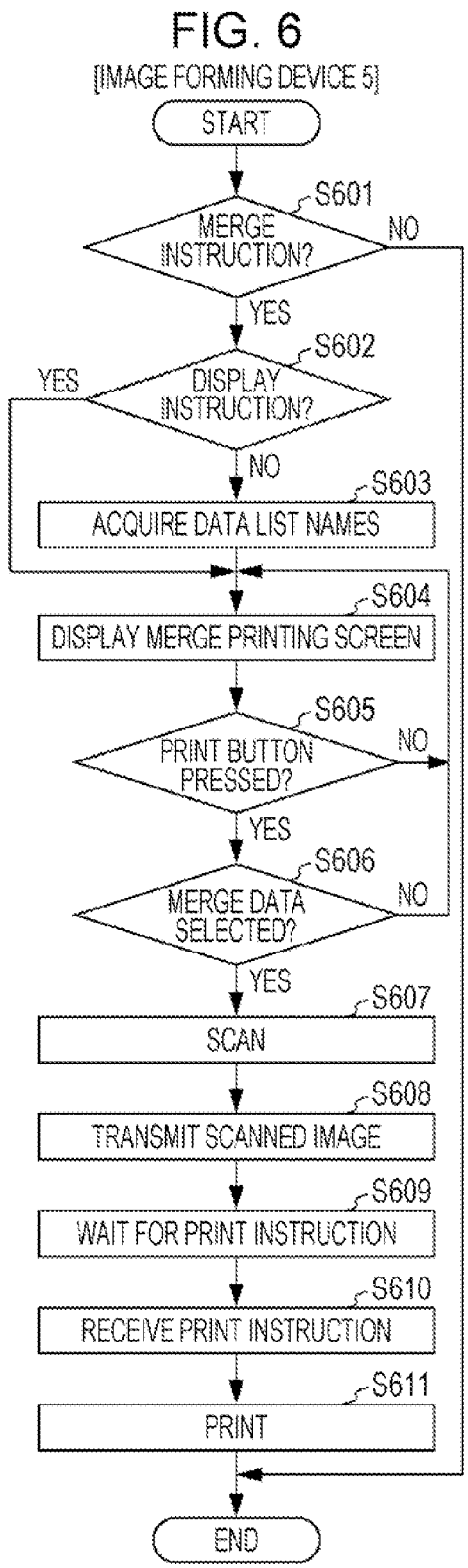

FIG. 8C
MARK COLOR: MERGE COLUMN

RED: 2ND COLUMN
BLUE: 3RD COLUMN
GREEN: 4TH COLUMN

FIG. 8F
MARK COLOR: FILE NAME

RED: FILE 1
BLUE: FILE 2
GREEN: FILE 3

FIG. 8D
MARK COLOR: DATA TYPE

RED: TEXT DATA
BLUE: PRINT TIME
GREEN: IMAGE DATA

FIG. 8G
MARK COLOR: MERGE METHOD

RED: ADD DATA
BLUE: ADD DATA
GREEN: MASKING, ADD DATA

FIG. 8E
MARK COLOR: ATTRIBUTE

RED: TEACHER, STUDENT, BUSINESS
BLUE: TEACHER, STUDENT
GREEN: TEACHER

FIG. 8A
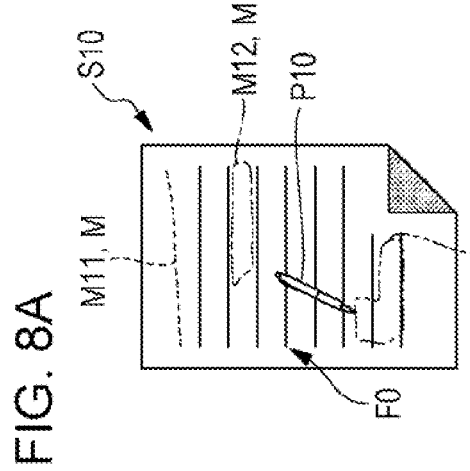

FIG. 8B

| ATTRIBUTE | NAME | DATE | ADDRESS |
|---|---|---|---|
| TEACHER | TARO FUJI | 1/1/20XX | MINATO MIRAI, NISHI-KU, YOKOHAMA |
| STUDENT | HANAKO FUJI | 1/1/20XX | MINATO MIRAI, NISHI-KU, YOKOHAMA |
| STUDENT | JIRO FUJI | 1/1/20XX | MINATO MIRAI, NISHI-KU, YOKOHAMA |
| BUSINESS | EMIKO FUJI | 1/1/20XX | MINATO MIRAI, NISHI-KU, YOKOHAMA |

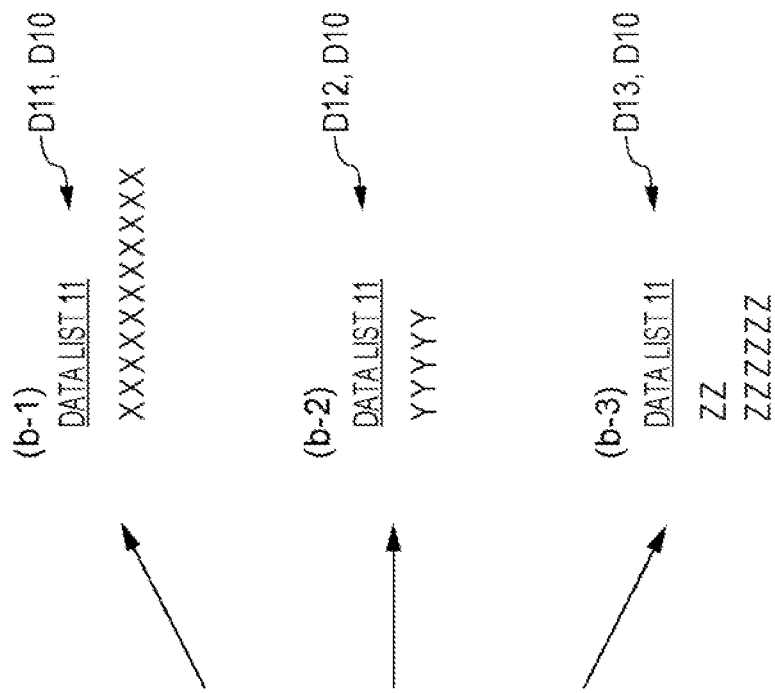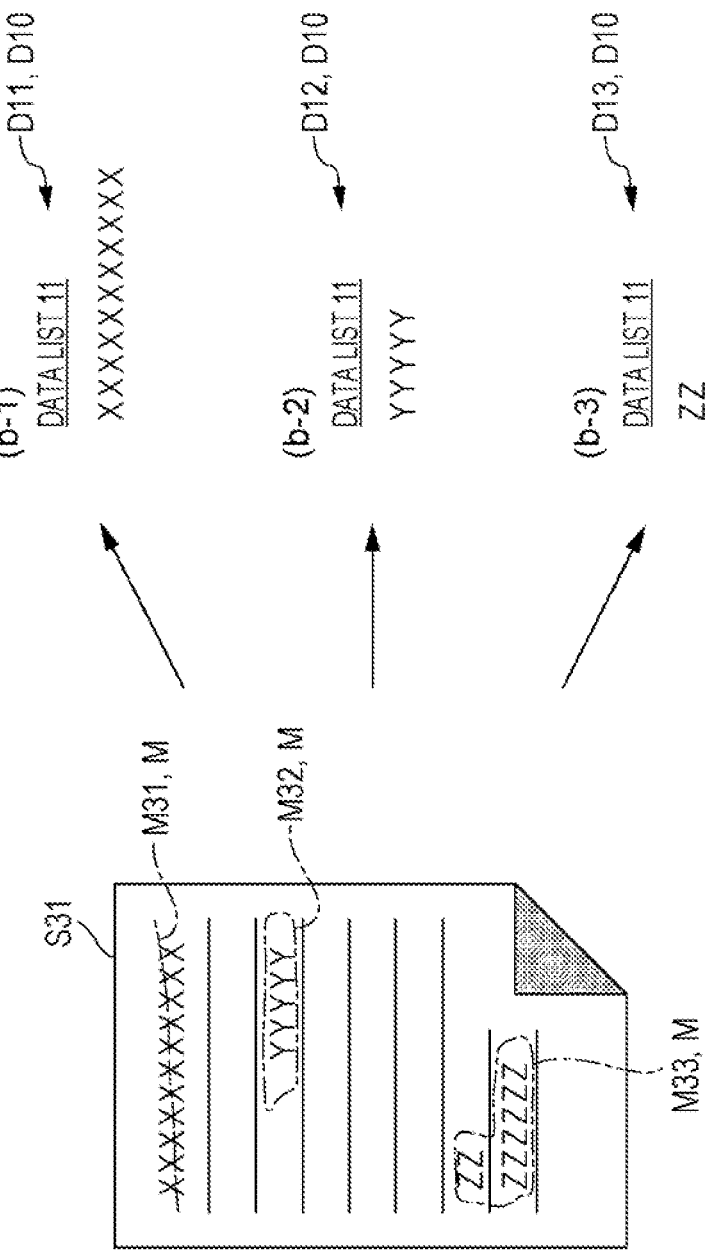

IMAGE FORMING APPARATUS FOR READING INDICIA ON A SHEET AND INSERTING IMAGES ON A SUBSEQUENT PRINTED SHEET AT A LOCATION CORRESPONDING TO THE LOCATION OF THE READ INDICIA

CROSS-REFERENCE TO RELATED APPLICATIONS

This application is based on and claims priority under 35 USC 119 from Japanese Patent Application No. 2015-014636 filed Jan. 28, 2015.

BACKGROUND

Technical Field

The present invention relates to an image processing device, an image processing method, and an image forming system.

SUMMARY

According to an aspect of the invention, there is provided an image processing device including a detector, a recognition unit, an acquisition, unit, and an output unit. The detector detects an image formed on a sheet, and a mark applied to the sheet. The recognition unit recognizes a mark position, which is a position where the mark is formed on the image. The acquisition unit acquires an additional image to be added and formed at the mark position. The output unit forms an output image using the image detected by the detector and the additional image acquired by the acquisition unit.

BRIEF DESCRIPTION OF THE DRAWINGS

An exemplary embodiment of the present invention will be described in detail based on the following figures, wherein:

FIGS. 3A to 3D are diagrams illustrating merge printing;

FIGS. 4A to 4C are diagrams illustrating merge regions;

FIG. 6 is a flowchart illustrating an example of merge printing operation on an image forming device;

FIGS. 8A to 8G are diagrams for explaining Exemplary Modification 1;

FIGS. 10A and 10B are diagrams for explaining Exemplary Modification 3;

DETAILED DESCRIPTION

Hereinafter, an exemplary embodiment of the invention will be described in detail and with reference to the attached drawings.

<Image Forming System 1>

Figure 1:
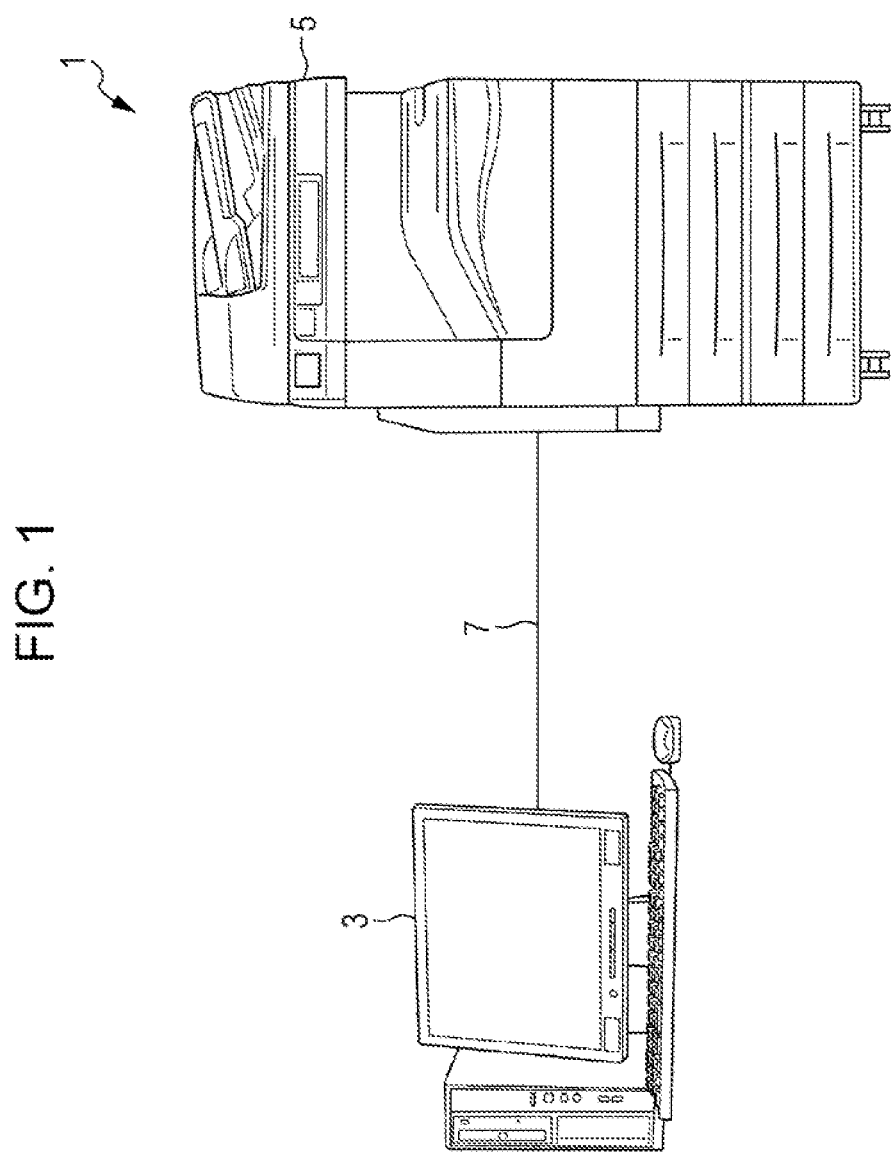
FIG. 1 is a diagram illustrating an overall configuration of an image forming system applying an exemplary embodiment.

FIG. 1 is an illustration of an exemplary configuration of an image forming system 1 applying an exemplary embodiment.

As illustrated in FIG. 1, in the image forming system 1, a terminal device 3 and an image forming device 5 are connected via a network 7.

The terminal device 3 is a computer device that instructs the image forming device 5 to print. Herein, a personal computer (PC) may be used as the terminal device 3, for example. In this case, the PC may be one that operates as a client PC, or one that operates as a server PC.

The image forming device 5 is what is called a multi-function device including an image forming function that forms an image onto a medium such as paper (printer function) and an image reading function that reads an image from a medium such as paper (scanner function). Also, besides the printer function and the scanner function, the image forming device 5 is equipped with a copy function, a fax function, and a merge print function (discussed later).

The network 7 is a communication network used to communicate information between the terminal device 3 and the image forming device 5. Herein, a local area network (LAN) or the Internet may be used as the network 7.

<Terminal Device 3>

Figure 2:
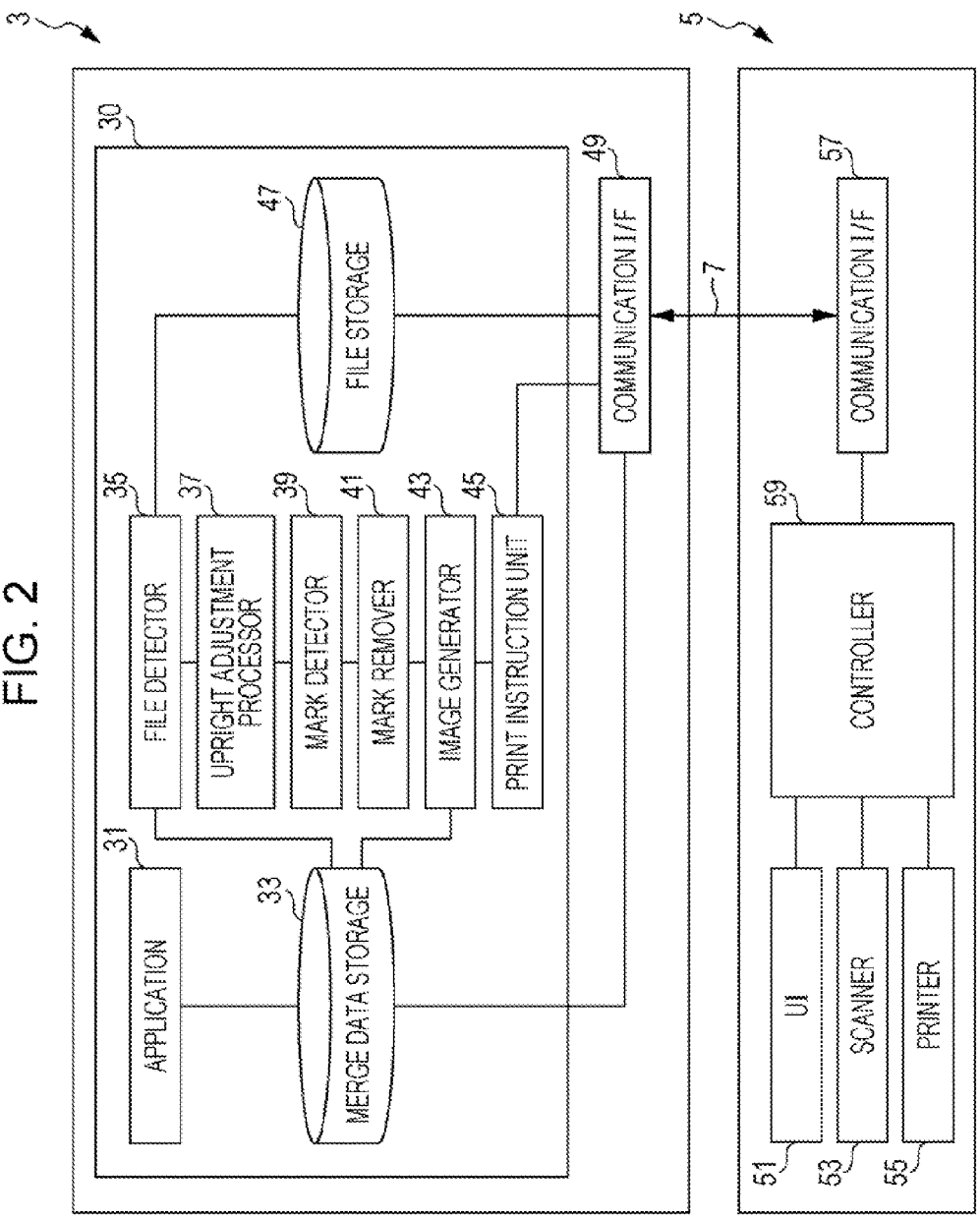
FIG. 2 illustrates an exemplary functional configuration of a terminal device and an image forming device.

FIG. 2 illustrates an exemplary functional configuration of the terminal device 3 and the image forming device 5.

Next, the terminal device 3 will be described with reference to FIG. 2.

As illustrated in FIG. 2, the terminal device 3 is equipped with a controller 30 that controls the functional members constituting the terminal device 3, and a communication I/F 49 that transmits and receives signals between the terminal device 3 and an external device (image forming device 5).

The controller 30 provided in the terminal device 3 will now be described.

In the controller 30, an application program (hereinafter called the "application") 31, merge data storage 33, a file detector 35, an upright adjustment processor 37, a mark detector 39, a mark remover 41, an image generator 43, a print instruction unit 45, and file storage 47 operate.

Of these, the application 31 is a program that, in accordance with a user operation, creates merge data D0 (see FIG. 3B discussed later) and a list name of merge data D0, or imports merge data D0 created outside the application 31.

The merge data storage 33 stores the merge data D0 and the list name transmitted from the application 31.

The file detector 35, which is an example of a detector, detects that the file storage 47 has stored (received) an image file (discussed later). Note that the file detector 35 may also function as a monitoring tool. For example, the file detector 35 monitors the file storage 47 in millisecond units. Subsequently, when triggered by the file detector 35 detecting that an image file was stored in the file storage 47, the file detector 35 activates a merge printing process in the terminal device 3.

The file detector 35 also receives a list name of merge data D0 stored by the file storage 47. The file detector 35 also searches to determine whether or not merge data D0 corresponding to the received list name is stored in the merge data storage 33.

In addition, if merge data D0 corresponding to the received list name is not stored in the merge data storage 33, the file detector 35 transmits, to the image forming device 5, an instruction to display a list selection screen 520 (see FIG. 5B discussed later).

The upright adjustment processor 37 conducts a process of making an image file stored by the file storage 47 upright. In other words, the upright adjustment processor 37 conducts an automatic upright adjustment process that vertically straightens an image file by rotating the orientation (top-to-bottom, left-to-right) of an image file stored by the file storage 47. Note that when the upright adjustment process is performed on the image forming device 5 side, the upright adjustment process by the upright adjustment processor 37 may be omitted.

The mark detector 39, which is an example of a recognition unit, detects one or more marks M (see FIG. 3C discussed later) included in an image file on which the upright adjustment processor 37 has performed the automatic upright adjustment process. The mark detector 39 also acquires region information (discussed later), such as the size and position of one or more merge regions R (see FIG. 4A discussed later), on the basis of one or more marks M detected in an image file.

Note that when forming an image according to region information acquired by the mark detector 39, the mark detector 39 conducts a sort (discussed later) of the positions of marks M.

The mark remover 41, which is an example of an output unit, conducts a process of removing marks M (mark images) included in an image file according to established technology such as a clipping process or a masking process. The mark remover 41 may also function as a masking/clipping engine. Note that the performance of the clipping process or masking process conducted by the mark remover 41 is adjusted according to a configuration file.

The image generator 43, which is an example of an acquisition unit and an output unit, generates an image of an image file merged with merge data D0, on the basis of an image file and merge data D0. In other words, the image generator 43 generates an image combining an image file of a document into which data is merged, and the merge data D0.

More specifically, the image generator 43 generates an image using an image file from which images of marks M have been removed by the mark remover 41, merge data D0 stored by the merge data storage 33, and region information acquired by the mark detector 39. Note that since the images of the marks M are not included in the generated image, the user may make marks M without regard for the format of the marks M.

The print instruction unit 45 outputs to the image forming device 5 a print instruction to print an image generated by the image generator 43. Note that, unlike the example illustrated in the drawings, when multiple image forming devices 5 are connected to the terminal device 3, a print instruction is output to a predetermined image forming device 5. Note that the image forming device 5 to execute merge printing may be specified in advance using a configuration file or the like, for example.

The file storage 47 stores an image file acquired by the image forming device 5. The file storage 47 may function as what is called a shared folder. Note that the types of files stored in the file storage 47 are not particularly limited.

Note that the controller 30 is equipped with a central processing unit (CPU), main memory, and a hard disk drive (HDD), which are not illustrated in the drawings. Herein, the CPU executes computational processing, and realizes the above functions of the terminal device 3. Also, the main memory is a storage area that stores information such as data used in the execution of various programs, while the hard disk drive is a storage area that stores information such as input data for programs and output data from programs.

<Image Forming Device 5>

Next, the image forming device 5 will be described with reference to FIG. 2.

As illustrated in FIG. 2, the image forming device 5 includes a UI 51, a scanner 53, a printer 55, a communication I/F 57, and a controller 59.

The UI 51 functions as a user interface with a user. In other words, the UI 51 displays a function selection screen 510 (see FIG. 5A discussed later) and a merge list selection screen 520 (see FIG. 5B discussed later), and receives operations from the user based on these screens.

The scanner 53, which is an example of an image reading unit, reads an image formed on a medium such as paper, following instructions from the user. More specifically, the scanner 53 reads an image F0 (see FIG. 3A discussed later) formed on a sheet S0 (see FIG. 3A) that acts as the document into which data is merged, and generates an image file.

The printer 55, which is an example of a printing unit, forms an image (prints) onto a medium such as paper, according to established technology such as an electrophotographic system or an inkjet system.

The communication I/F 57 transmits and receives signal with an external device (terminal device 3) that is external to the image forming device 5.

The controller 59 controls the functional members constituting the image forming device 5 (in the example illustrated in the drawing, the UI 51, the scanner 53, the printer 55, and the communication I/F 57).

More specifically, the controller 59 acquires a list name of merge data D0 from the terminal device 3 via the communication I/F 57. In addition, the controller 59 receives an instruction for simple merge printing (discussed later) and a selection of merge data D0 via the UI 51.

The controller 59 also transmits an image file acquired via the scanner 53 to the terminal device 3. The controller 59 also receives a print instruction from the terminal device 3 via the communication I/F 57. The controller 59 also executes printing via the printer 55, in accordance with a print instruction received from the terminal device 3.

Note that the controller 59 is equipped with a CPU, main memory, and an HDD, which are not illustrated in the drawings. The CPU executes computational processing, and realizes the above functions of the image forming device 5.

<Merge Printing>

FIGS. 3A to 3D are diagrams illustrating merge printing. Specifically, FIG. 3A is a diagram illustrating a sheet S0 on which an image F0 is formed, FIG. 3B is a diagram illustrating merge data D0, FIG. 3C is a diagram illustrating a sheet S0 on which marks M have been made, and FIG. 3D is a diagram illustrating sheets S1, S2, and S3 on which images have been formed by merge printing.

Next, merge printing executed by the exemplary embodiment will be described with reference to FIG. 2 and FIGS. 3A to 3D.

First, the execution of merge printing using the sheet S0 on which the image F0 is formed as illustrated in FIG. 3A, and the merge data D0 illustrated in FIG. 3B, will be described.

Herein, merge printing refers to printing by embedding other data (merge data D0) into the image F0, which includes information such as a document or form created by a word processing software or the like. Note that merge printing may also be described as a function of printing information such as address labels or invoice statements using a common layout while changing part of the data, for example.

In technology of the related art different from the present exemplary embodiment, when executing merge printing, the document into which data is merged (not illustrated) and the merge data (not illustrated) is prepared as electronic data. Additionally, the electronic data may require configuration in a special-purpose application. Furthermore, the merge position in the document into which data is merged (corresponding to the merge region R discussed later) may required configuration in advance with electronic data.

Consequently, in the above related art, it is difficult to execute merge printing immediately on a document which has not been configured for merge printing.

Also, changing the merge position or the merge data D0 may require changing the configuration of electronic data using a PC or the like on which a special-purpose application is installed. As a result, there is a lengthy time period leading up to starting the work of changing the merge position or the merge data D0.

Also, if a terminal device (such as a PC) on which the special-purpose application is installed is not available, changing the configuration of the electronic data may not be possible. Furthermore, the operations for changing the configuration may be difficult for people who are not users experienced with operating the special-purpose application.

Accordingly, in the present exemplary embodiment, merge configuration using a color pen P (see FIG. 3C) is made possible, thereby providing an environment of easy merge printing.

Hereinafter, merge printing executed in the present exemplary embodiment will be described specifically.

First, as illustrated in FIG. 3A, an image F0 formed on a sheet S0 is the document into which data is merged. Note that the sheet S0 may exemplify a printout of the image F0 by another image forming device (not illustrated) different from the image forming device 5, but may also be a printout of the image F0 by the image forming device 5.

In addition, the image F0 in the example illustrated in the drawings is an image indicating a framework (lines). More specifically, the sheet S0 onto which the image F0 is formed is a so-called form, on which a framework is printed in black and white monotone.

Also, as illustrated in FIG. 3B, the merge data D0 is date of images to embed into the image F0. The merge data D0 is created (or imported) by the application (special-purpose application) 31 of the terminal device 3, and stored by the merge data storage 33.

In the example illustrated in the drawings, the merge data D0 illustrated in the drawings is a file in comma-separated values (CSV) format, for example.

In addition, the merge data D0 includes multiple data types (in the example in the drawings, "Name", "Date", and "Address"). In the merge data D0 illustrated in the drawings, the data types are each arranged vertically, expressed as the three columns of a first column D1, a second column D2, and a third column D3. More specifically, in the merge data D0 illustrated in the drawings, one horizontal row is one unit of merge data D0. In the merge data D0, data for three sheets S1, S2, and S3 (see FIG. 3D) is provided on three rows (first row D5, second row D6, third row D7).

Note that the individual pieces of data constituting the merge data D0 may be data expressed on one horizontal line (one tier) like the first column D1 and the second column D2, or data expressed on two horizontal lines (multiple lines, multiple tiers) like the third column D3. Additionally, if treated as one-tier data, the process of deciding a font size discussed later is simplified.

In the present exemplary embodiment, when the user desires to conduct merge printing on the sheet S0, the user specifies one or more regions where merge printing is desired on the sheet S0. Specifically, as illustrated in FIG. 3C, the user makes a mark M (M1, M2, M3) in the desired place to embed the merge data D0 on the sheet S0 (merge region R, see FIG. 4A discussed later).

The mark M is a line (figure) drawn by the user on the sheet S0 with a color pen P. Additionally, the mark M is made on the sheet S0 by the user without using the terminal device 3 or the image forming device 5. Specifically, the mark M is added (applied) to the sheet S0 using a red felt-tip pen or the like. In addition, a pen (writing implement) commercially available as stationery may be used as the color pen P.

Herein, the shape of the mark M is not particularly limited. A shape having width and height is sufficient, examples of which include a diagonal shape in which a line is drawn diagonally like the mark M1, and a frame shape in which framing lines are drawn like the marks M2 and M3.

Subsequently, as illustrated in FIG. 3D, an image with the merge data D0 merged thereinto is generated on the basis of the mark information (discussed later) of the one or more marks M, and the sheets S1, S2, and S3 are printed. Note that in the example illustrated in the drawings, the images (output images) F1, F2, and F3 respectively formed on the sheets S1, S2, and S3 are formed by merging (inserting) the data included on each row (first row D5, second row D6, third row D7) of the merge data D0. In addition, since the data included on the first row D5, the second row D6, and the third row D7 is mutually different, the images F1, F2, and F3 respective formed on the sheets S1, S2, and S3 are also mutually different images.

<Merge Region R>

FIGS. 4A to 4C are diagrams illustrating the merge region R. Specifically, FIG. 4A is a diagram illustrating the relationship between the mark M and the merge region R, FIG. 4B is a diagram illustrating relationships between the height H of the merge region R and merge images (added images) F10, F11, and F13, and FIG. 4C is a diagram illustrating relationships between the width W of the merge region R and merge images F15 and F17.

As illustrated in FIG. 4A, the merge region R is decided on the basis of the mark M. Specifically, the position and dimension of the merge region R is decided according to the position and dimension of the mark M. In the example illustrated in the drawings, a region enclosed by a box touching the outer periphery of the mark M (circumscribing rectangle) is taken to be the merge region R. Additionally, information related to the merge region R, such as the position of the merge region R in the image F0 (sheet S0) and the size of the merge region R, is acquired by the mark detector 39 (see FIG. 2) as region information.

As illustrated in FIG. 4B, in the present exemplary embodiment, the size of the merge image F10 to be formed in the merge region R is decided according to the size of the merge region R. For example, the size of the merge image F10 is adjusted to be the maximum size that will fit into the merge region R. Note that this size adjustment is executed by the image generator 43, for example.

Size adjustment of the merge image F10 will now be described specifically.

In the example illustrated in the drawings, as illustrated by (b-1) in FIG. 4B, the font size (character size) of the merge image F10 is decided according to the size (height H, width W) of the merge region R.

Specifically, as illustrated by (b-2) in FIG. 4B, the font size is decided according to the heights H1 and H2 of the merge regions R11 and R13. In the example illustrated in the drawings, the height H1 of the merge region R11 is greater than the height H2 of the merge region R13. Thus, in this case, the merge image F11 to be formed inside the merge region R11 has a larger font than the merge image F13 to be formed inside the merge region R13.

In addition, as illustrated by (c-1) and (c-2) in FIG. 4C, the font size is decided according to the widths W1 and W2 of the merge regions R15 and R17. In the example illustrated in the drawings, the width W1 of the merge region R15 is greater than the width W2 of the merge region R17. Thus, in this case, the merge image F15 to be formed inside the merge region R15 has a larger font than the merge image F17 to be formed inside the merge region R17.

In this way, in the example illustrated in the drawings, the font size of the merge image F10 is determined according to both sizes (height H, width W) of the merge region R.

Note that the font size may also be determined according to any one or a combination of the height H, the width W, or another dimension of the merge region R (such as the length of the diagonal, for example).

Next, a process of sorting the positions of marks M will be described. As illustrated in FIG. 4A, when multiple marks M (M1, M2, M3) are formed on the sheet S0, it is convenient to identify each individual mark M.

Accordingly, in the present exemplary embodiment, an ordering of the positions of the marks M (sort process) is conducted according to the positions of the marks M. Specifically, the marks M are ordered by position proceeding from top to bottom on the sheet S0 (see the arrow C1 in FIG. 4A). Furthermore, the marks M are ordered by position proceeding from left to right on the sheet S0 (see the arrow C2 in FIG. 4A).

In other words, a process of sorting the marks M is conducted according to position in the top-to-bottom direction and in the left-to-right direction, while prioritizing position in the top-to-bottom direction. Subsequently, the data in the merge data D0 is merged by following the order of the marks M obtained by the sort process (marker order).

Note that the sort process is executed by the image generator 43, for example.

In the example illustrated in the drawings, the mark M1, mark M2, and mark M3 proceeding from top to bottom are formed in that order. Consequently, the marker order becomes the order of mark M1, mark M2, mark M3. Subsequently, the first row D5 included on the first row in the merge data D0 is merged into the mark M1 that is first in the marker order. Similarly thereafter, the second row D6 is merged into the mark M2 that is second in the marker order, and the third row D7 is merged into the mark M3 that is third in the marker order.

<Settings Screens>

Figure 5A:
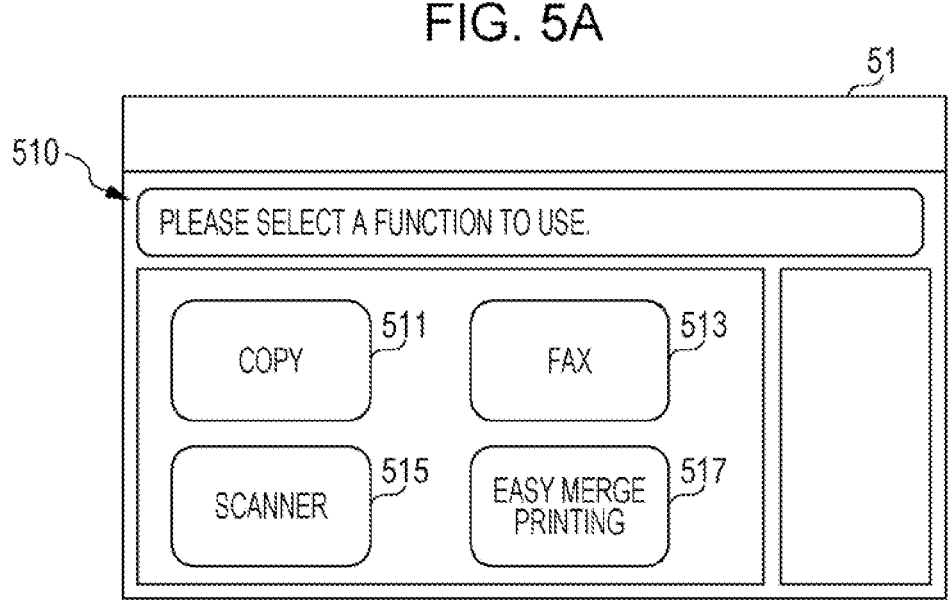
FIGS. 5A and 5B are diagrams illustrating an example of settings screens displayed on a UI of an image forming device.
Figure 5B:
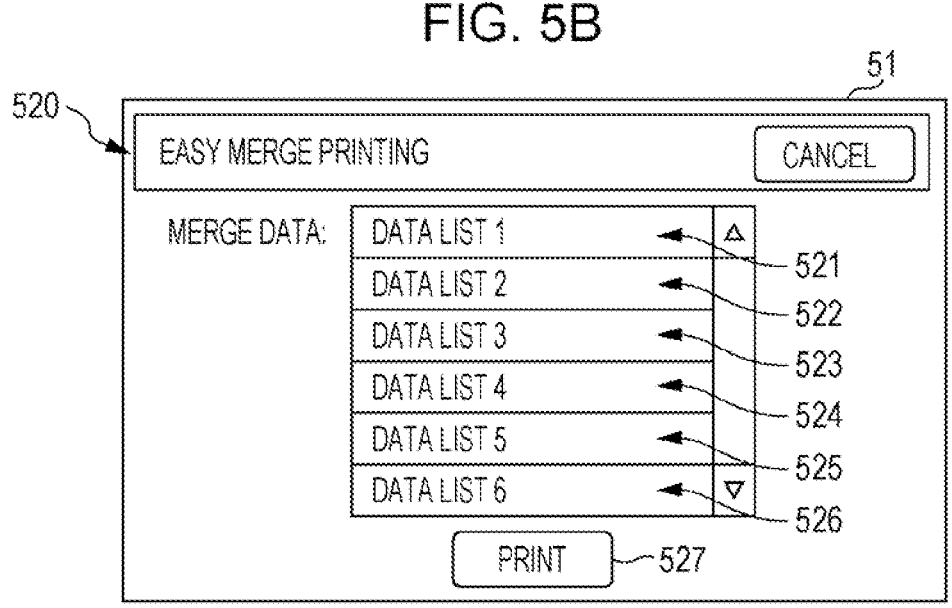

FIGS. 5A and 5B are diagrams illustrating an example of settings screens displayed on the UI 51 of the image forming device 5. Specifically, FIG. 5A illustrates a function selection screen 510 displayed on the UI 51, and FIG. 5B illustrates a list selection screen 520 displayed on the UI 51.

Next, settings screens displayed on the UI 51 of the image forming device 5 (the function selection screen 510 and list selection screen 520) will be described with reference to FIGS. 5A and 5B.

The function selection screen 510 illustrated in FIG. 5A is a screen that receives the specification of a function provided in the image forming device 5. The function selection screen 510 is provided with a copy button 511, a fax button 513, a scanner button 515, and an easy merge printing button 517.

Herein, as discussed earlier, the image forming device 5 includes a copy function, a scanner function, a fax function, and a merge printing function (easy merge printing function). Additionally, by having the user select one of the copy button 511, the fax button 513, the scanner button 515, and the easy merge printing button 517 on the function selection screen 510, an instruction to execution the function corresponding to the selected button is received.

The list selection screen 520 illustrated in FIG. 5B is a screen that receives the selection of merge data D0. The list selection screen 520 displays the list names of merge data D0 stored in the merge data storage 33.

Herein, the list selection screen 520 is provided with list selection buttons 521 to 526 each displaying the list name of a piece of merge data D0, and a print execution button 527.

On the list selection screen 520, by having the user select one of the list selection buttons 521 to 526, an instruction to execute merge printing based on the merge data D0 corresponding to the selected button is received. In addition, when the print execution button 527 is selected, merge printing is started.

<Merge Printing Operation on Image Forming Device 5>

FIG. 6 is a flowchart illustrating an example of merge printing operation on the image forming device 5.

Next, an example of merge printing operation on the image forming device 5 will be described with reference to FIG. 2, FIGS. 3A to 3D, and FIGS. 5A and 5B.

First, suppose that, as a state prior to starting the merge printing operation, the function selection screen 510 (see FIG. 5A) is being displayed on the UI 51 of the image forming device 5. Also suppose that a sheet S0 with marks M drawn thereon by the user (see FIG. 3C) has been placed (set) in a scannable state in the scanner 53 of the image forming device 5.

Subsequently, as illustrated in FIG. 6, the controller 59 judges whether or not an instruction to execute the merge printing function (merge instruction) was received via the UI 51 (step 601). Specifically, the controller 59 judges whether or not the easy merge printing button 517 on the function selection screen 510 was pressed.

If the merge instruction was received (step 601, Yes), the controller 59 judges whether or not a display instruction (discussed later) was received from the terminal device 3 (step 602).

If the display instruction was not received (step 602, No), the controller 59 acquires the list names of merge data D0 stored in the merge data storage 33 from the terminal device 3 (step 603). Subsequently, the controller 59 displays the list selection screen 520 (see FIG. 5B) on the UI 51 (Display merge printing screen, step 604).

Next, the controller 59 judges whether or not the print execution button 527 (see FIG. 5B) on the list selection screen 520 (see FIG. 5B) was pressed (step 605). If the print execution button 527 was pressed (step 605, Yes), the controller 59 judges whether or not a selection of merge data D0 was received (step 606). Specifically, the controller 59 judges whether or not one of the list selection buttons 521 to 526 (see FIG. 5B) on the list selection screen 520 was pressed.

If a selection of merge data D0 was received (step 606, Yes), the controller 59 executes a scan of the sheet S0 with marks M drawn thereon (see FIG. 3C) via the scanner 53 (step 607). Also, the controller 59 transmits the scanned image to the terminal device 3 (step 608), and waits for a print instruction from the terminal device 3 (step 609).

Next, if a print instruction is received from the terminal device 3 (step 610), the controller 59 executes printing onto sheets via the printer 55 (step 611).

<Merge Printing Operation on Terminal Device 3>

Figure 7:
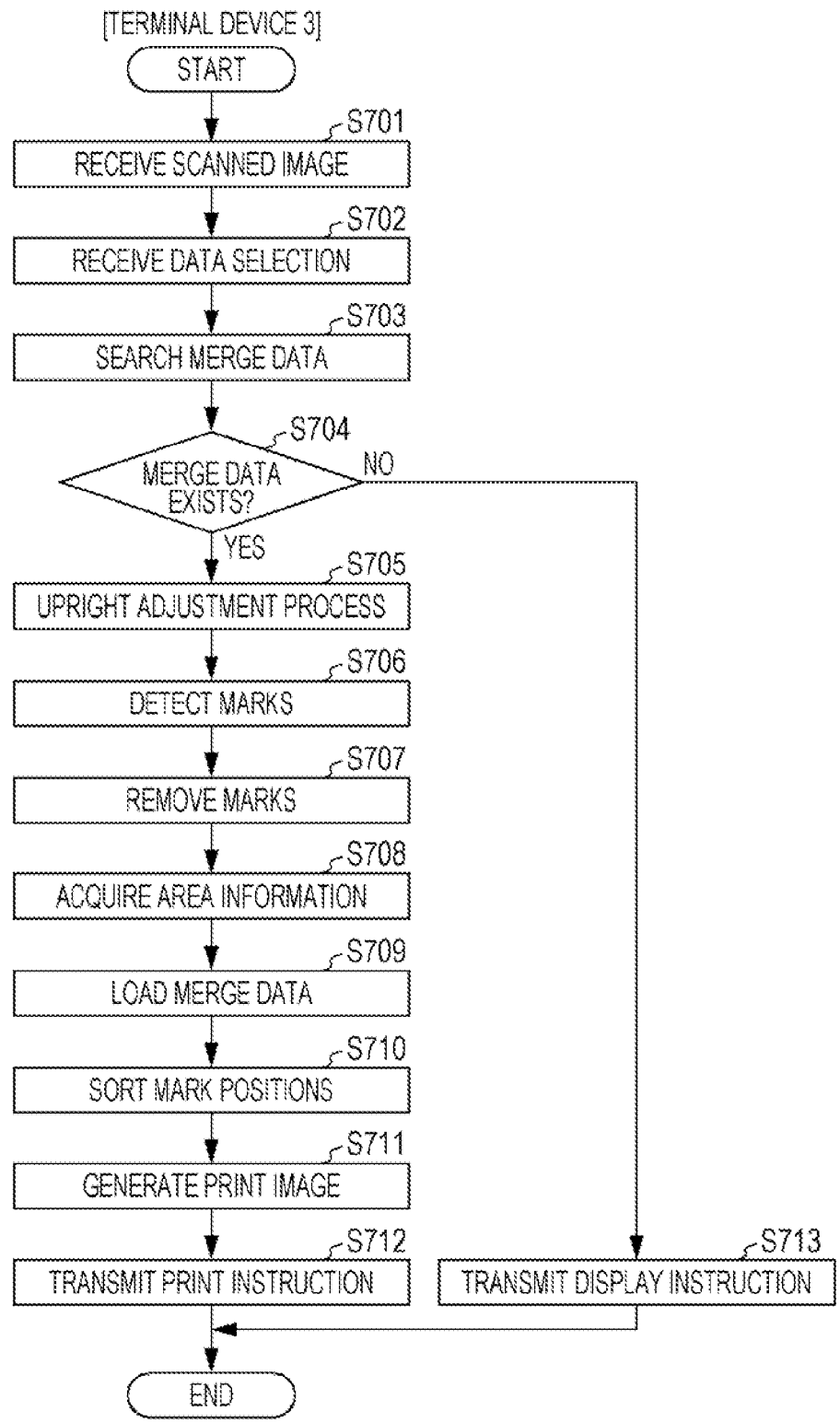
FIG. 7 is a flowchart illustrating an example of merge printing operation on a terminal device.

FIG. 7 is a flowchart illustrating an example of merge printing operation on the terminal device 3.

Next, an example of merge printing operation on the terminal device 3 will be described with reference to FIG. 2, FIGS. 3A to 3D, and FIG. 7.

First, in the present exemplary embodiment, merge printing operation on the terminal device 3 is started when triggered by the receiving of an image of the sheet S0 scanned by the image forming device 5. In other words, when starting merge printing, the user is not required to operate the terminal device 3 directly.

More specifically, in the example illustrated in FIG. 7, first, the file detector 35 detects the receiving of a scanned image on the terminal device 3 (step 701). Specifically, the file detector 35 detects that an image file of the sheet S0 has been stored by the file storage 47. Additionally, the file detector 35 receives the list name of merge data D0 stored by the file storage 47 (step 702).

Next, the file detector 35 searches to determine whether or not the merge data D0 of the received list name is being stored in the merge data storage 33 (step 703). Subsequently, the file detector 35 judges whether or not the merge data D0 of the received list name was found (step 704).

If the merge data D0 of the received list name was found (step 704, Yes), the upright adjustment processor 37 conducts a process of making the image file stored by the file storage 47 upright (step 705). Additionally, the mark detector 39 detects marks M included in the image file on which the upright adjustment processor 37 has performed the automatic upright adjustment process (step 706). The mark remover 41 removes detected images of marks M from the image file (step 707). Furthermore, the mark detector 39 acquires region information on the basis of the detection of the marks M (step 708).

Next, the image generator 43 loads the merge data D0 corresponding to the received list name (see step 702) from the merge data storage 33 (step 709).

Also, the image generator 43 conducts a process of sorting the mark positions (step 710). Additionally, the image generator 43 generates an image using an image file from which images of marks M have been removed by the mark remover 41, merge data D0 stored by the merge data storage 33, and region information acquired by the mark detector 39 (step 711).

Subsequently, the print instruction unit 45 outputs to the image forming device 5 a print instruction regarding the image generated by the image generator 43 (step 712).

Note that if the merge data D0 of the received list name is not found (step 704, No), the file detector 35 transmits the list name of one or more pieces of merge data D0 to the image forming device 5 (step 713). Specifically, the file detector 35 transmits an instruction to display, via the list selection screen 520, the list name of one or more pieces of merge data D0 stored in the merge data storage 33 (display instruction).

As above, in the present exemplary embodiment, merge printing is executed using the sheet S0 in a printed state, rather than electronic data. In other words, the specification of one or more merge positions (merge regions R) is executed in a later step.

Also, in the present exemplary embodiment, by specifying merge positions on a paper document using the color pen P, advance configuration of electronic data becomes unnecessary. Furthermore, by changing the size of the marks M with the color pen P, the font size of the merged text is adjusted.

Exemplary Modification 1

FIGS. 8A to 8G are diagrams for explaining Exemplary Modification 1. Specifically, FIG. 8A is a diagram illustrating a sheet S10 on which marks M have been made, FIG. 8B is a diagram illustrating merge data D10, and FIGS. 8C to 8G are diagrams illustrating how the data to be merged is switched according to the color of the marks M.

The foregoing exemplary embodiment describes the execution of merge printing on the basis of a sheet S0 (see FIG. 3C) on which single-color (red) marks M have been made, and the execution of merge printing in units of rows arranged horizontally in the merge data D0. However, an exemplary embodiment is not limited thereto.

For example, in one possible configuration, marks M in multiple colors are formed, and merge printing is conducted on the basis of the colors of the marks M. Alternatively, merge printing may be executed on the basis of an element other than a row in the merge data D0.

More specifically, consider a sheet S10 with marks M (M11, M12, M13) made thereon, as illustrated in FIG. 8A. The marks M11, M12, and M13 are lines drawn on the sheet S10 with color pens P10 of different colors. Herein, suppose that the mark M11, the mark M12, and the mark M13 are drawn with color pens P10 of red color, blue color, and green color, respectively.

Also, as illustrated in FIG. 8B, the merge data D10 includes an "Attribute" data type for each piece of data, in addition to "Name", "Date", and "Address". Herein, "Attribute" includes the types (ranks) of "Teacher", "Student", and "Business".

According to the sheet S10 illustrated in FIG. 8A and the merge data D10 in FIG. 8B, the execution of merge printing like the following is exemplified.

For example, as illustrated in FIG. 8C, the data included on one of the columns of the merge data D10 (merge columns) may be specified for merging according to the color of the mark M.

Specifically, the respective pieces of data in the second column "Name" of the merge data D10 are merged into the region specified by the red mark M11. Similarly, the respective pieces of data in the third column "Date" are merged into the region specified by the blue mark M12, while the respective pieces of data in the fourth column "Address" are merged into the region specified by the green mark M13.

As another example, as illustrated in FIG. 8D, the type of data to be merged may be specified according to the color of the mark M. Specifically, character string data (text information) specified in the merge data D10 is merged into the region specified by the red mark M11. In addition, the date (time) of executing merge printing is merged into the region specified by the blue mark M12. In addition, image data such as a photo or graphic other than the merge data D10 is merged into the region specified by the green mark M13. Note that the data for specifying an image in the merge data D10 may be a path on the terminal device 3, a URL, or the like, for example.

Also, as another example, as illustrated in FIG. 8E, the execution of merge printing in a region may be enabled or disabled according to the color of the mark M in that region. In the example illustrated in the drawings, the data of all attributes in the merge data D10, specifically the data classified into "Teacher", "Student", and "Business", is merged into the region specified by the red mark M11. On the other hand, only the data classified into some attributes in the merge data D10 is merged into the regions specified by marks M other than the red mark M11.

Specifically, the data classified into "Teacher" and "Student" is merged into the region specified by the blue mark M12, while the data classified into "Teacher" is merged into the region specified by the green mark M13. In other words, the data classified into "Business" is not printed in the region specified by the blue mark M12, and the data classified into either "Student" or "Business" is not printed into the region specified by the green mark M13.

Also, as another example, as illustrated in FIG. 8F, the merge data D10 itself may be switched according to the color of the mark M. In the example illustrated in the drawings, the merge data D10 of FIG. 8B (a first file) is merged into the region specified by the red mark M11. On the other hand, other merge data (such as a second file and a third file; not illustrated) is respectively merged into the regions specified by the blue mark M12 and the green mark M13.

As described in the foregoing exemplary embodiment, when the terminal device 3 receives an image file transmitted from the image forming device 5, the mark remover 41 of the terminal device 3 removes the marks M included in the image file, and in addition, executes merge printing while adding images of the data of the merge data D0 (data addition) into the merge regions R based on the marks M.

At this point, the configuration may also process images of the merge regions R in addition to executing data addition. For example, the configuration may first conduct a process (whitening, for example) that treats the image of the merge regions R as a color corresponding to the color of the sheet S10 (white, for example), also called a masking process, and then add the images of data of the merge data D0. By conducting the masking process, the image of the loaded data becomes clear.

Furthermore, as illustrated in FIG. 8G, whether or not to additionally conduct the masking process may be switched according to the color of the mark M. Specifically, data addition is executed without executing the masking process in the regions specified by the red mark M11 and the blue mark M12. On the other hand, data addition is executed after executing the masking process in the region specified by the green mark M13.

Note that, although omitted from the drawings, the format of a character string to merge may also be modified according to the color of the mark M. For example, features such as the font size, the font color, the presence or absence of underlining, and a toggle between normal and bold text may be specified for each color of the mark M.

Furthermore, in addition to the color of the mark M, or instead of the color of the mark M, the content of the merge printing process may be switched according to factors such as the position of the mark M, the shape of the mark M (such as a diagonal shape or a frame shape), or the line type of the mark M (such as a solid line or a dashed line).

Exemplary Modification 2

Figure 9A:
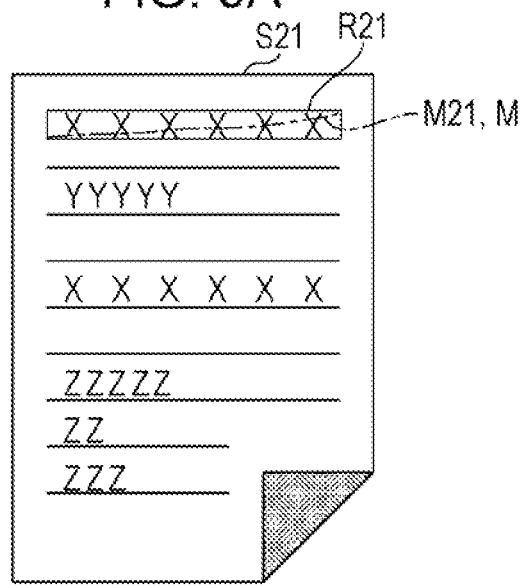
FIGS. 9A and 9B are diagrams for explaining Exemplary Modification 2.
Figure 9B:
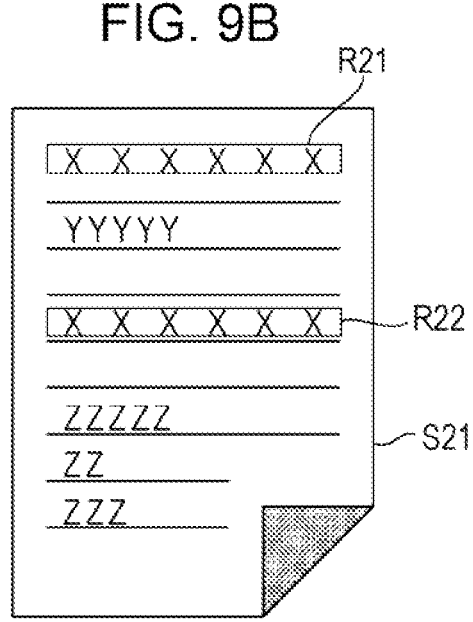

FIGS. 9A and 9B are diagrams for explaining Exemplary Modification 2. Specifically, FIG. 9A is a diagram illustrating a sheet S21 on which marks M have been made, and FIG. 9B is a diagram illustrating that another merge region R22 is specified by a merge region R21.

The foregoing describes adding the images of data in merge data D0 to merge regions R based on marks M, but the configuration is not limited thereto.

For example, as illustrated in FIG. 9A, a character string included in a merge region R based on a mark M may be recognized, and a character string matching the recognized character string may be replaced with a character string specified by the merge data D0.

At this point, consider a case in which a mark M21 has been made on a sheet S21, as illustrated in FIG. 9A. A character string "XXXXXX" is included in the merge region R21 specified by the mark M21. Subsequently, the mark detector 39 recognizes the character string, and also detects that a character string matching "XXXXXX" exists in another location of the image file, for example. Subsequently, the region including the character string "XXXXXX" is specified as a merge region R22. Next, the character strings in the merge region R21 and the merge region R22 are replaced by character strings specified by the merge data D0.

For example, the user may make the mark M21 on the character string "Showa" in one location, thereby causing all instances of the character string "Showa" in the entire document (sheet S21) to be replaced with "Heisei". Consequently, the user does not have to make the mark M21 on all of the "Showa" character strings.

Exemplary Modification 3

FIGS. 10A and 10B are diagrams for explaining Exemplary Modification 3. Specifically, FIG. 10A is a diagram illustrating a sheet S31 specified by marks M, and FIG. 10B is a diagram illustrating merge data D11, D12, and D13 created by character strings specified on the basis of the marks M.

The foregoing describes adding the images of merge data D0 to merge regions R based on marks M. On the other hand, the merge data D0 may also be created by character strings specified on the basis of the marks M.

The following describes a sheet S31 on which marks M31, M32, and M33 have been made, as illustrated in FIG. 10A. Subsequently, the mark detector 39 detects the marks M31, M32, and M33, and also recognizes character strings specified by the marks M31, M32, and M33, for example. Subsequently, each of the recognized character strings are stored in the merge data storage 33 as merge data D11, D12, and D13, for example.

Note that in the case of multiple sheets S31, a list (table) of the merge data D11, D12, and D13 is created by executing the above process.

Exemplary Modification 4

Figure 11:
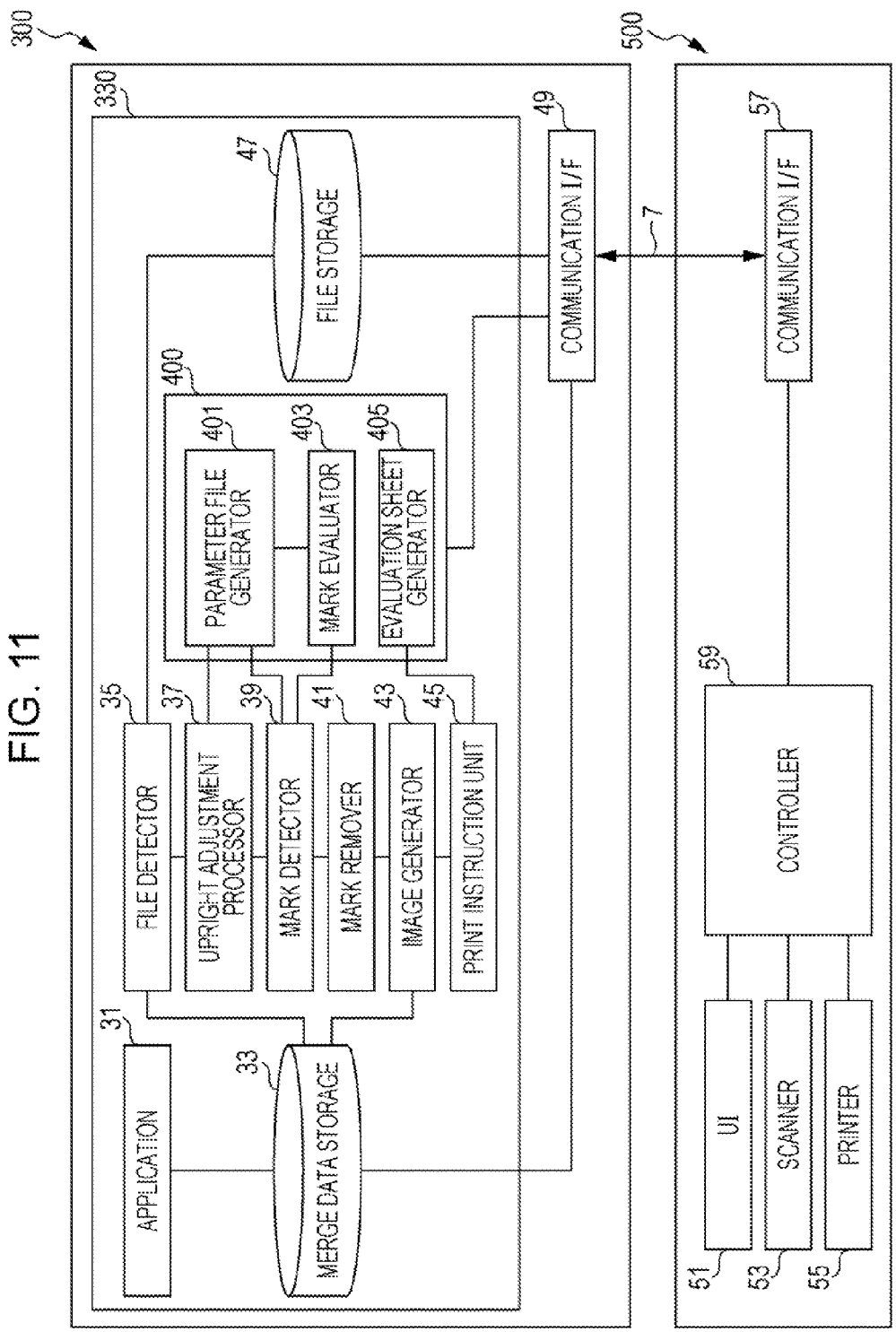
FIG. 11 illustrates an exemplary functional configuration of a terminal device and an image forming device according to Exemplary Modification 4.

FIG. 11 illustrates an exemplary functional configuration of a terminal device 300 and an image forming device 500 according to Exemplary Modification 4. Note structural elements which are the same as in the terminal device 3 illustrated in FIG. 2 above will be denoted with the same signs, and further description thereof will be reduced or omitted hereinafter.

Figure 12:
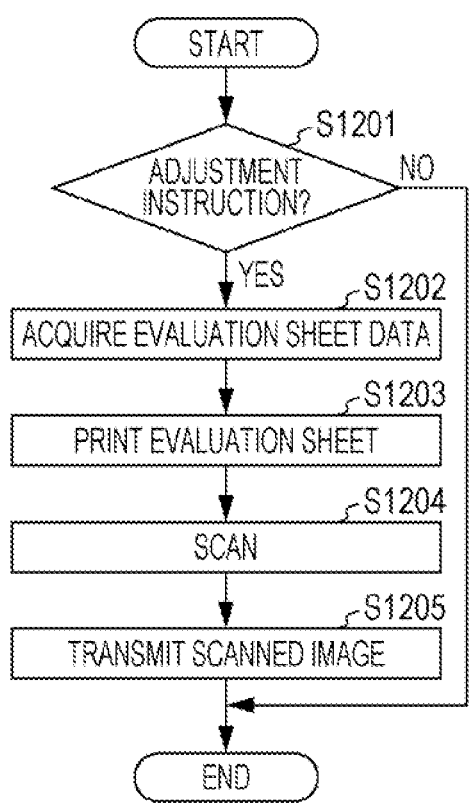
FIG. 12 is a flowchart illustrating exemplary operation of an image forming device according to Exemplary Modification 4.
Figure 13:
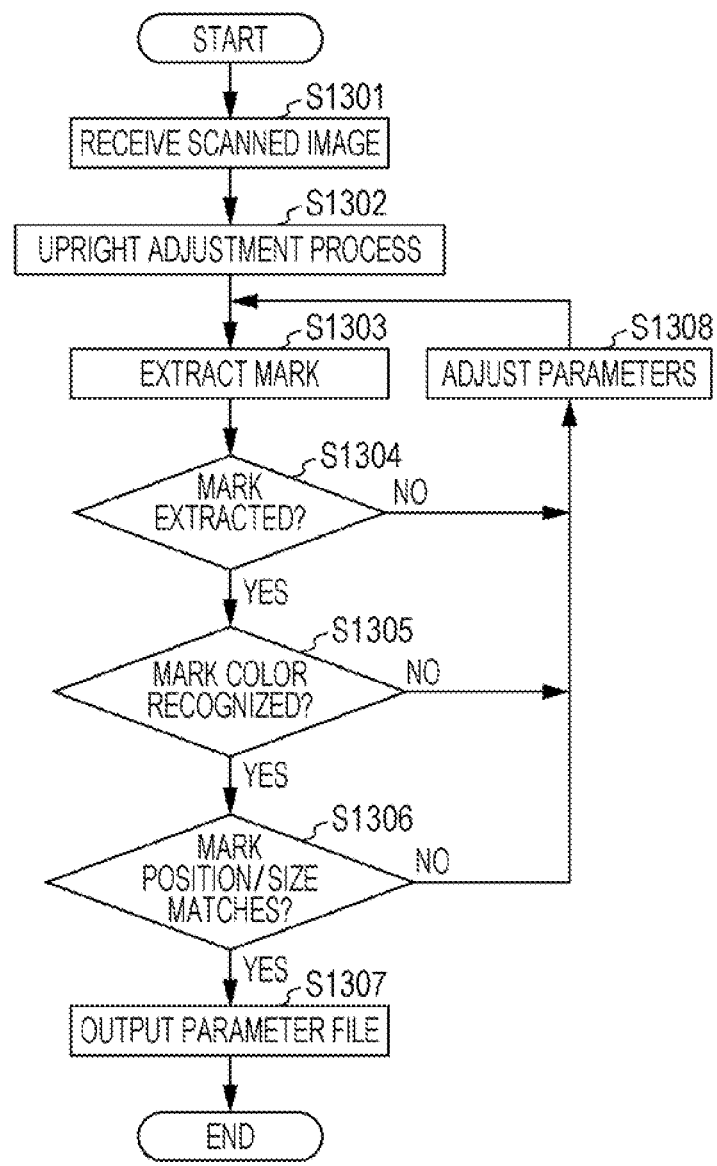
FIG. 13 is a flowchart illustrating exemplary operation of a terminal device according to Exemplary Modification 4.

Also, FIG. 12 is a flowchart illustrating exemplary operation of the image forming device 500 according to Exemplary Modification 4. FIG. 13 is a flowchart illustrating exemplary operation of the terminal device 300 according to Exemplary Modification 4.

Note that in the foregoing, the mark detector 39 of the terminal device 3 is described as detecting marks M in an image file. In order for the mark detector 39 to detect the marks M, preprocessing for making marks easier to recognize may also be conducted. The preprocessing may include making marks with a pen similar to the pen used for the actual marking, and comparing against a result read in with the image reading device used for the actual reading. Note that the mark detector 39 in this configuration functions as a decision unit that decides in advance a mark image to recognize as a mark.

Also, in order for the mark detector 39 to detect the marks M, a process of adjusting configuration parameters may also be conducted. Herein, the configuration parameters may be, for example, the scanning mode, the sheet size, the resolution, the brightness, the side to be scanned, the enabling or disabling of correction, the scan region, and gamma correction.

Additionally, the adjustment of configuration parameters may also be executed by using an evaluation sheet (not illustrated). The evaluation sheet is a sheet on which the user makes one or more marks M of predetermined size (shape) at a predetermined position on the evaluation sheet. Additionally, the evaluation sheet includes an image such as frame lines for the user to trace with the color pen P, for example.

Specifically, the controller 330 may be equipped with a parameter adjuster (adjuster) 400, as in the terminal device 300 of FIG. 11. In the terminal device 300, a parameter file generator 401, a mark evaluator 403, and an evaluation sheet generator 405 operate as the parameter adjuster 400.

The parameter file generator 401 creates a parameter file (parameter sheet), which is a file including a configured value for each parameter. The parameter file generator 401 also stores a default parameter file.

The mark evaluator 403 evaluates the detection of a mark M conducted by the mark detector 39. Specifically, the mark evaluator 403 judges whether or not the mark detector 39 detected a mark M. The mark evaluator 403 also judges whether or not the mark detector 39 identified the color of a mark M. The mark evaluator 403 also judges whether or not a mark M detected by the mark detector 39 has a predetermined position and size, and additionally judges conditions such as whether or not a mark drawn with a single line was recognized as multiple marks. Subsequently, the configuration parameters are adjusted so that these evaluation results become suitable.

The evaluation sheet generator 405 outputs, to the image forming device 5 via the print instruction unit 45, an instruction to output an evaluation sheet (not illustrated).

Next, exemplary operation on the image forming device 500 will be described with reference to FIG. 12.

First, the controller 59 judges whether or not an instruction to execute parameter adjustment (adjustment instruction) was received via the UI 51 (step 1201). If the adjustment instruction was received (step 1201, Yes), the controller 59 receives the data of an evaluation sheet from the terminal device 300 (evaluation sheet generator 405) (step 1202), and executes printing of the evaluation sheet via the printer 55 (step 1203).

Next, the controller 59 executes scanning of the evaluation sheet on which the user has made a mark M (step 1204). Subsequently, the controller 59 transmits the scanned image to the terminal device 300 (step 1205).

Next, exemplary operation on the terminal device 300 will be described with reference to FIG. 13.

First, the file detector 35 of the terminal device 300 detects that the file storage 47 received (stored) an image file of a scanned image (step 1301). Subsequently, the upright adjustment processor 37 conducts a process of making the image file stored by the file storage 47 upright (step 1302).

Next, the mark detector 39 extracts (detects) a mark M in the image file on which the upright adjustment processor 37 has performed the upright adjustment process (step 1303). Note that the parameters used when conducting the extraction of the mark M obey the default parameter file stored by the parameter file generator 401.

Subsequently, the mark evaluator 403 judges whether or not the mark detector 39 extracted the mark M (step 1304). If the mark M was extracted (step 1304, Yes), the mark evaluator 403 judges whether or not the mark detector 39 identified the color of the mark M (step 1305). If the color of the mark M was identified (step 1305, Yes), the mark evaluator 403 judges whether or not the mark M extracted by the mark detector 39 has a predetermined position and size (step 1306).

Subsequently, if the mark M has a predetermined position and size (step 1306, Yes), the default parameter file stored by the parameter file generator 401 is output as the parameter file (step 1307).

On the other hand, if the mark M is not extracted (step 1304, No), or if the color of the mark M is not identified (step 1305, No), or if the mark M does not have the predetermined position and size (step 1306, No), the parameter file generator 401 adjusts the parameters (step 1308). Subsequently, the mark detector 39 extracts the mark M in accordance with the adjusted parameters (step 1303).

As above, in the present exemplary modification, by having the user use the image forming device 500 to scan an evaluation sheet with the mark M made thereon, parameter adjustment is executed on the terminal device 300. Note that parameter adjustment is executed automatically until a good extraction result of the mark M is achieved.

Note that when the user uses color pens P of multiple colors to execute merge printing, multiple marks M are made with the color pen P of each color on multiple locations on the evaluation sheet, or on multiple evaluation sheets. Subsequently, the above parameter adjustment is executed for each mark M.

Other Exemplary Modifications

Although the above FIG. 3C illustrates the sheet S0 as a so-called form, the sheet S0 is not limited thereto. It is sufficient for the sheet S0 to include an image, and the image may be a document or a table, for example. The image may be formed on the sheet S0 by the image forming device 5, or be formed on the sheet S0 by being handwritten by the user. Alternatively, an envelope or postcard with an address written thereon as the image may be treated as the sheet S0.

Also, although the above FIG. 3C illustrates the marks M being formed (made) with a color pen P, it is sufficient for the marks M to be made on the sheet S0 by the user without using the terminal device 3 or the image forming device 5.

For example, the marks M may also be made with a writing instrument such as a highlighter pen, a ballpoint pen, or a colored pencil, or with a seal or stamp. Additionally, a sticker may be affixed to the sheet S0, and the sticker may be treated as the mark M.

Also, the above FIG. 3D illustrates a format in which the character strings to be merged by merge printing are arranged horizontally (also called horizontal writing), but the format is not limited thereto. In other words, the format may also be one in which the character strings to be merged by merge printing are arranged vertically (also called vertical writing).

In this case, an instruction regarding whether to execute merge printing for horizontal writing or vertical writing is received from the user, and the format is switched between horizontal writing and vertical writing according to this specification.

Alternatively, horizontal writing and vertical writing may also be recognized according to the dimensions of the merge region R (see FIG. 4A). Specifically, the format may be switched between vertical writing and horizontal writing according to whether or not the ratio of the height and width of the merge region R exceeds a threshold, for example. The format also may be switched between vertical writing and horizontal writing according to whether or not a tilt in the lengthwise direction of the merge region R exceeds a threshold. The format also may be switched between vertical writing and horizontal writing according to the color of the mark M.

The above FIG. 4A illustrates a region enclosed by a circumscribing rectangle of the mark M as the merge region R, but it is sufficient for the merge region R to be determined according to the position of the mark M. For example, a predetermined range from the center of the mark M (center of height and center of width) may also be treated as the merge region R.

Additionally, FIG. 4B illustrates deciding the font size on the basis of the height H and the width W of the merge region R, but it is sufficient to decide the font size according to the dimensions of the merge region R. For example, the font size may also be decided according to one of either the height H or the width W of the merge region R, or according to the length of the diagonal of the merge region R.

Additionally, established technology is used for the method of detecting the mark M included in the image file, but may also be executed by executing a scan of the sheet S0 multiple times, for example.

In other words, in one possible configuration, the sheet S0 is scanned before the user makes one or more marks M (first scan). After that the user makes one or more marks M on the sheet S0. Subsequently, the sheet S0 with one or more marks M made thereon is scanned (second scan). The one or more marks M are detected according to the difference in the image data obtained between the first scan and the second scan. According to this configuration, the detection accuracy of marks M may be improved.

Also, in one possible configuration, when an image is formed on the sheet S0 by the image forming device 5, the data of the image formed by the image forming device 5, or data corresponding to the data of the image, may be received, and the image formed on the sheet S0 may be recognized according to the received data. Note that in this configuration, the terminal device 3 is equipped with a receiving unit that receives the above data of the image (or corresponding data).

Also, the foregoing describes the execution of merge printing by the image forming system 1, but the configuration is not limited thereto insofar as additional images are formed at the positions of one or more marks M added by the user. For example, the image forming system 1 may also be configured to add the same additional information to multiple sheets S on which different images are formed, or in other words multiple sheets S not having a common layout, and thereby form output images that are respectively different from each other.

In the description of the above FIG. 6, the image forming device 5 is described as executing scanning (step 607) and printing (step 611). However, scanning (step 607) and printing (step 611) may also be executed respectively by separate image forming devices 5.

In addition, in the description of FIGS. 6, 7, and the like, merge printing is described as being executed by the terminal device 3 and the image forming device 5, but the configuration is not limited thereto. For example, the image forming device 5 may also be configured to execute the functions of the above terminal device 3. With this configuration, the execution of merge printing becomes possible with the image forming device 5 alone.

Note that while the foregoing describes various exemplary embodiments and exemplary modifications, obviously these exemplary embodiments and exemplary modifications may also be combined together.

Furthermore, the present disclosure is not limited to the foregoing exemplary embodiments, and may also be carried out in various aspects without departing from the principles of the present disclosure.

What is claimed is:

1. An image processing device comprising:
   a detector that detects an image formed on a sheet, and a mark applied to the sheet; and
   a processor configured to act as:
     a recognition unit that recognizes a mark position, the mark position being a position where the mark is formed on the image;
     an acquisition unit that acquires an additional image to be added and formed at the mark position; and
     an output unit that forms an output image using the image detected by the detector and the additional image acquired by the acquisition unit,
   wherein when a plurality of the additional image differs from each other, the output unit outputs a number of output documents corresponding to the number of different additional images, and
   wherein when a plurality of marks are formed on the sheet, the processor is further configured to:
     sort the plurality of marks according to position in a top-to-bottom direction and in a left-to-right direction, while prioritizing the position in the top-to-bottom direction; and
     add and form each of a plurality of additional images acquired by the acquisition unit at respective mark positions in accordance with an order in which the plurality of marks are sorted.

2. The image processing device according to claim 1, wherein
   the output unit does not output in the output image an image of the mark detected by the detector.

3. The image processing device according to claim 2, wherein
   the output unit removes an image formed at the mark position in the image detected by the detector.

4. The image processing device according to claim 1, wherein the output unit removes an image formed at the mark position in the image detected by the detector.

5. The image processing device according to claim 1, wherein
the output unit changes a size of the additional image in the output image according to a size of the mark.

6. The image processing device according to claim 1, wherein
the acquisition unit stores text information as the additional image, and
the output unit changes a size of text to be formed in the output image as the additional image, according to a size of the mark.

7. The image processing device according to claim 1, wherein the processor is further configured to act as:
a decision unit that decides in advance a mark image to recognize as the mark, and
wherein the recognition unit recognizes the mark position by a comparison with the mark image decided by the decision unit.

8. The image processing device according to claim 1, wherein
the image formed on the sheet is formed by an image forming device, and
the image processing device comprises:
the processor is further configured to act as a receiving unit that receives information of an image formed on the sheet by the image forming device.

9. An image processing device comprising:
a detector that detects an image formed on a sheet, and a mark applied to the sheet; and
a processor configured to act as:
a recognition unit that recognizes a mark position, the mark position being a position where the mark is formed on the image;
an acquisition unit that acquires an additional image to be added and formed at the mark position; and
an output unit that forms an output image using the image detected by the detector and the additional image acquired by the acquisition unit,
wherein the detector reads a sheet after the image is formed but before the mark is applied, and subsequently reads the sheet after the mark is applied, and
wherein when a plurality of marks are formed on the sheet, the processor is further configured to:
sort the plurality of marks according to position in a top-to-bottom direction and in a left-to-right direction, while prioritizing the position in the top-to-bottom direction; and
add and form each of a plurality of additional images acquired by the acquisition unit at respective mark positions in accordance with an order in which the plurality of marks are sorted.

10. An image processing device comprising:
a detector that detects an image formed on a sheet, and a mark applied to the sheet; and
a processor configured to act as:
a recognition unit that recognizes a mark position, the mark position being a position where the mark is formed on the image;
an acquisition unit that acquires an additional image to be added and formed at the mark position; and
an output unit that forms an output image using the image detected by the detector and the additional image acquired by the acquisition unit,
wherein the output unit chooses the additional image from a database according to a color of the mark, and
wherein when a plurality of marks are formed on the sheet, the processor is further configured to:
sort the plurality of marks according to position in a top-to-bottom direction and in a left-to-right direction, while prioritizing the position in the top-to-bottom direction; and
add and form each of a plurality of additional images acquired by the acquisition unit at respective mark positions in accordance with an order in which the plurality of marks are sorted.

11. An image processing device comprising:
a detector that detects an image formed on a sheet, and a mark applied to the sheet; and
a processor configured to act as:
a recognition unit that recognizes a mark position, the mark position being a position where the mark is formed on the image;
an acquisition unit that acquires an additional image to be added and formed at the mark position; and
an output unit that forms an output image using the image detected by the detector and the additional image acquired by the acquisition unit,
wherein the detector includes an adjuster that reads in advance a mark color to recognize as the mark, and adjusts a detection mode of the mark, and
wherein when a plurality of marks are formed on the sheet, the processor is further configured to:
sort the plurality of marks according to position in a top-to-bottom direction and in a left-to-right direction, while prioritizing the position in the top-to-bottom direction; and
add and form each of a plurality of additional images acquired by the acquisition unit at respective mark positions in accordance with an order in which the plurality of marks are sorted.

12. An image processing method comprising:
detecting an image formed on a sheet, and a mark applied to the sheet;
recognizing a mark position, the mark position being a position where the mark is formed on the image;
acquiring an additional image to be added and formed at the mark position;
forming an output image using the detected image and the acquired additional image; and
when a plurality of the additional image differs from each other, outputting a number of output documents corresponding to the number of different additional images; and
when a plurality of marks are formed on the sheet, sorting the plurality of marks according to position in a top-to-bottom direction and in a left-to-right direction, while prioritizing the position in the top-to-bottom direction, and adding and forming each of a plurality of acquired additional images at respective mark positions in accordance with an order in which the plurality of marks are sorted.

13. An image forming system comprising:
a scanner that reads an image formed on a sheet by an image forming device, and a mark added to the sheet by a user;
a processor configured to act as:
a recognition unit that recognizes a mark position, the mark position being a position where the mark is formed on the image;
an acquisition unit that acquires an additional image to be added and formed at the mark position;

an output unit that forms an output image using the image read by the scanner and the additional image acquired by the acquisition unit; and a printer that prints an output image formed by the output unit onto a sheet, wherein when a plurality of the additional image differs from each other, the output unit outputs a number of output documents corresponding to the number of different additional images, and wherein when a plurality of marks are formed on the sheet, the processor is further configured to:

sort the plurality of marks according to position in a top-to-bottom direction and in a left-to-right direction, while prioritizing the position in the top-to-bottom direction; and add and form each of a plurality of additional images acquired by the acquisition unit at respective mark positions in accordance with an order in which the plurality of marks are sorted.

14. An image processing device comprising:

a detector that detects an image formed on a sheet, and a mark applied to the sheet;

a storage configured to store a database, the database including a plurality of rows, the plurality of rows including a plurality of additional images, wherein each of the plurality of rows includes an additional image, and the additional image in each row is different from the additional image in each of the other rows; and a processor configured to act as:

a recognition unit that recognizes a mark position, the mark position being a position where the mark is formed on the image;

an acquisition unit that acquires the additional image to be added and formed at the mark position; and an output unit that forms at least one output image using the image detected by the detector and the additional image acquired by the acquisition unit, wherein for each row of the database, the output unit outputs a sheet on which an output image corresponding to the additional image in the row is merged onto the image, and wherein when a plurality of marks are formed on the sheet, the processor is further configured to:

sort the plurality of marks according to position in a top-to-bottom direction and in a left-to-right direction, while prioritizing the position in the top-to-bottom direction; and add and form each of a plurality of additional images acquired by the acquisition unit at respective mark positions in accordance with an order in which the plurality of marks are sorted.

15. An image processing device comprising:

a detector that detects a black and white image formed on a sheet, and a color mark applied to the sheet; and a processor configured to act as:

a recognition unit that recognizes a color mark position, the color mark position being a position where the color mark is formed on the black and white image;

an acquisition unit that acquires an additional image to be added and formed at the color mark position; and an output unit that forms an output image using the image detected by the detector and the additional image acquired by the acquisition unit, wherein when a plurality of marks are formed on the sheet, the processor is further configured to:

sort the plurality of marks according to position in a top-to-bottom direction and in a left-to-right direction, while prioritizing the position in the top-to-bottom direction; and add and form each of a plurality of additional images acquired by the acquisition unit at respective mark positions in accordance with an order in which the plurality of marks are sorted.

\* \* \* \* \*